United States Patent Office 2,721,202
Patented Oct. 18, 1955

2,721,202
PROCESS FOR THE MANUFACTURE OF PURE NICOTINIC ACID

Willi Wirz, Reinach, Basel-Land, Switzerland, assignor to Hoffmann-La Roche Inc., Nutley, N. J., a corporation of New Jersey No Drawing. Application September 16, 1952, Serial No. 309,934

Claims priority, application Switzerland October 4, 1951

4 Claims. (Cl. 260—295.5)

It is well known that the manufacture of pure colorless nicotinic acid is a difficult problem. Though it is relatively easy to obtain an acid with adequate melting point by recrystallization, the elimination of colored impurities is troublesome and the isolation of the desired acid from the mother liquors requires an additional amount of work.

It has now been found that nicotinic acid of correct melting point may be obtained in a fully colorless state by a simple technical procedure which comprises subjecting a mixture of an inert solvent and a nicotinic acid containing composition, such as crude nicotinic acid or the product obtained by thermic treatment of a compound which is capable of being transformed thereby into nicotinic acid, to azeotropic distillation. The invention is particularly well suited for the purification of crude nicotinic acid which is produced in situ by decarboxylation at elevated temperature, for example a temperature above 130° C., of suitable dicarboxylic acids, such as, for example, quinolinic acid and isocinchomeronic acid. Suitable solvents are for example tetralin, diphenyl, diphenyl ether or mixtures thereof.

Example 1

700 parts by weight of a mixture of 190 parts by weight of diphenyl and 510 parts by weight of diphenyl ether are distilled in a Claisen flask together with 73.7 parts by weight of crude nicotinic acid. Except for very little of a black residue, the whole contents of the flask distills over. As the distillate cools down, the nicotinic acid crystallizes therein in a colorless state and with an almost quantitative yield. The crystals are sucked off and washed with petroleum ether of low boiling point. After drying 72 parts by weight of colorless nicotinic acid melting at 236–237° C. are obtained. The solvent employed may be used for the next batch after its separation from the crystallized nicotinic acid.

Example 2

The procedure of Example 1 is repeated, except that the nicotinic acid is replaced by 100 parts by weight of quinolinic acid. At a temperature of the contents of the flask of 130° C. an energetic carbon dioxide evolution occurs whereby nicotinic acid is formed. The latter may be isolated in a pure state in a manner analogous to that described in Example 1. 70 parts by weight of nicotinic acid of melting point 236–237° C. are thus produced.

Example 3

The procedure of Example 1 is repeated, except that the nicotinic acid is replaced by 100 parts by weight of isocinchomeronic acid. The formation of nicotinic acid occurs at a temperature of 210–230° C. After working up according to Example 1, 64 parts by weight of nicotinic acid of melting point 236–237° C. are obtained.

I claim:

1. A process for the manufacture of pure nicotinic acid which comprises subjecting a mixture of a nicotinic acid containing composition with an inert solvent selected from the group consisting of tetralin, diphenyl and diphenyl ether to azeotropic distillation.

2. The process of claim 1, wherein the impure nicotinic acid is formed in situ by thermic treatment of a compound capable of being thereby transformed into nicotinic acid.

3. A process for the produtcion of nicotinic acid which comprises subjecting a mixture of quinolinic acid with an inert solvent selected from the group consisting of tetralin, diphenyl and diphenyl ether to azeotropic distillation at a temperature above 130° C. and recovering substantially pure nicotinic acid from the distillate.

4. A process for the production of nicotinic acid which comprises subjecting a mixture of isocinchomeronic acid with an inert solvent selected from the group consisting of tetralin, diphenyl and diphenyl ether to azeotropic distillation at a temperature above 210° C. and recovering substantially pure nicotinic acid from the distillate.

References Cited in the file of this patent

UNITED STATES PATENTS

| | | |
|---|---|---|
| 2,389,065 | Lee et al. | Nov. 13, 1945 |
| 2,394,650 | Zimmerli | Feb. 12, 1946 |
| 2,578,672 | Corson et al. | Dec. 18, 1951 |